United States Patent [19]
Yoneyama et al.

[11] Patent Number: 6,161,951
[45] Date of Patent: Dec. 19, 2000

[54] VEHICULAR HEADLAMP

[75] Inventors: Masatoshi Yoneyama; Hiroki Ikegaya; Kazuhito Iwaki; Shoichi Fukasawa, all of Shizuoka, Japan

[73] Assignee: Koito Manufacturing, Tokyo, Japan

[21] Appl. No.: 09/187,424

[22] Filed: Nov. 6, 1998

[30]     Foreign Application Priority Data

Nov. 11, 1997 [JP] Japan ................................. 9-325273
Oct. 20, 1998 [JP] Japan ............................... 10-297470

[51] Int. Cl.[7] ........................................................ F21V 7/00
[52] U.S. Cl. .......................... 362/516; 362/265; 362/58; 362/61; 362/226; 362/375; 362/82
[58] Field of Search ................................. 362/265, 267, 362/374, 375, 546, 487, 547, 264, 373, 390, 369

[56]     References Cited

U.S. PATENT DOCUMENTS

| | | | |
|---|---|---|---|
| 2,095,192 | 10/1937 | Decker | 362/546 |
| 5,119,275 | 6/1992 | Makita | 362/61 |
| 5,140,504 | 8/1992 | Sato | 362/265 |
| 5,327,330 | 7/1994 | Van Oel et al. | 362/267 |
| 5,597,232 | 1/1997 | Ohashi et al. | 362/265 |
| 5,607,228 | 3/1997 | Ozaki et al. | 362/263 |
| 5,678,916 | 10/1997 | Watanabe et al. | 362/265 |
| 5,722,768 | 3/1998 | Suzuki et al. | 362/265 |
| 5,838,109 | 11/1998 | Kobayashi et al. | 362/265 |
| 5,906,428 | 11/1998 | Hori et al. | 362/265 |

FOREIGN PATENT DOCUMENTS

| | | | |
|---|---|---|---|
| 2711 214 | 10/1993 | France | F21M 3/00 |
| 9-129379 | 5/1997 | Japan . | |

*Primary Examiner*—Sandra O'Shea
*Assistant Examiner*—David W. Hobden
*Attorney, Agent, or Firm*—Sughrue, Mion, Zinn, Macpeak & Seas, PLLC

[57]     ABSTRACT

A vehicular headlamp including a discharge bulb which allows mounting of a lighting circuit case to a lamp body using a simple and inexpensive structure and which allows for easy removal of the lighting circuit case therefrom. Because it is disposed within the lamp body, the lighting circuit case need not have a full waterproof structure, and thus it can be formed as a simple, light-weight and inexpensive structure. The lamp body is composed of a main body having an opening and a cover for closing the opening. A mounting portion for the lighting circuit case is formed at a position closely adjacent the opening of the main body of the lamp body. As a result, the lighting circuit case can be easily removed through the opening.

21 Claims, 10 Drawing Sheets

PRIOR ART

VEHICULAR HEADLAMP

BACKGROUND OF THE INVENTION

The present invention relates to a vehicular headlamp of a type including a discharge bulb. More particularly, the invention relates to a vehicular headlamp having a structure for mounting a lighting circuit case to the lamp body of the headlamp.

Recently, discharge bulbs have increasingly been employed as the light source for vehicular headlamps because of their capability for high luminance irradiation.

A vehicular headlamp employing a discharge bulb requires a lighting circuit to apply high voltage for lighting the bulb. Generally, the lighting circuit is mounted in a separate lighting circuit case which is mounted to the exterior of the lamp body. Such an arrangement as has been conventionally employed is shown in FIG. 12, wherein a lighting circuit case 102 is fixed to an outer wall 104a of a lamp body 104 with a screw.

In the case where the lighting circuit case 102 is mounted on the outside of the lamp body 104 as described above, the lighting circuit case 102 must be waterproof so as to protect the lighting circuit 106 mounted therein. For this reason, the conventional lighting circuit case 102 is formed as an entirely separate unit structure, which must be provided with a high sealing capability and in which spaces not occupied by circuit components and the like are completely filled with a potting material such as an epoxy resin. However, manufacturing a lighting circuit unit employing the aforementioned waterproof structure requires high material costs and a large amount of labor, and the lighting circuit unit significantly adds to the weight of the overall lamp unit.

In the case where the lighting circuit case 102 is fitted to the outside of the lamp body 104 as described above, a hole 104b is formed in the lamp body 104 to pass a high voltage cable 112 for connecting the lighting circuit 106 to a socket 110 for the discharge bulb 108. Therefore, it is necessary to adequately seal the hole 104b.

It is possible to provide a structure for mounting the lighting circuit case within the lamp body. Merely disposing the lighting circuit case within the lamp body, however, may lead to problems as discussed below.

In the lamp unit assembling process, the lighting circuit case must be mounted within the lamp body prior to the assembly of the reflector and lens. As a result, it is substantially impossible to remove the lighting circuit case thereafter. In case of failure of the lighting circuit, the lamp unit as a whole has to be replaced. Moreover, in case of failure of the lamp unit owing to accident, etc., the lighting circuit case cannot be readily extracted from the lamp unit for recycling. Also, in order to provide a suitable structure for mounting the lighting circuit case to the inside of the lamp body, the mold used in the molding process for producing the lamp body inevitably becomes very complicated.

SUMMARY OF THE INVENTION

In view of foregoing, it is an object of the present invention to provide a vehicular headlamp of a type employing a discharge bulb as its light source, and which has a simple and inexpensive structure for mounting a lighting circuit case to the lamp body which allows the easy removal of the lighting circuit case from the lamp body.

The present invention realizes the aforementioned object by improving the structure for mounting the lighting circuit case within the lamp body.

More particularly, the present invention provides a vehicular headlamp including a lamp body in which there is mounted a reflector provided with a discharge bulb and a lighting circuit case for holding a lighting circuit that energizes the discharge bulb, wherein the lamp body has a main body with an opening and a cover attached to the main body so as to close the opening, and the lighting circuit case is mounted at a position within the lamp body closely adjacent the opening.

The opening and cover may be arbitrarily shaped and sized, and may be located in any suitable position so long as the opening is closed by the cover in order to realize the basic lamp body function.

The position for mounting the lighting circuit case is not limited so far as it is located in the vicinity of the opening within the lamp body. The lighting circuit case may be integrated with the main body of the lamp body or to the cover.

The vehicular headlamp of the present invention includes a lamp body having a main body portion having an opening, and a cover fitted to the main body of the lamp body to close the opening. As the lighting circuit case is fitted to the position in the vicinity of the opening within the lamp body, the following effects can be obtained.

Because the lighting circuit case is mounted on the inside of the lamp body and is closed by the main body of the lamp body and the cover, unlike the conventional structure provided outside the lamp body, no waterproofing structure is required. This allows the lighting circuit case to have a simple, light-weight and inexpensive structure.

As the lighting circuit case is mounted in a position in the vicinity of the opening of the lamp body, the mounting structure can be made simple in configuration by making use of the opening, which also has the effect of allowing the lighting circuit case to be removed from the lamp body easily.

The present invention provides the vehicular headlamp including a discharge bulb having a simple and inexpensive structure for mounting the lighting circuit case to the lamp body as well as allowing the lighting circuit case to be easily removed.

In the foregoing structure, if the mounting portion for the lighting circuit case is formed in the main body of the lamp body and the opening is formed to the rear of the mounting portion, the lighting circuit case can be inserted from the rear side through the opening. This arrangement allows the lighting circuit case to be easily removed in case of lamp unit failure.

Moreover, if the mounting portion is formed as a recess portion along a cross section of the lighting circuit case, the lighting circuit case can be easily positioned and mounted within the main body of the lamp body. In this case, if the reflector has a lower wall, it is possible to obtain a relatively large space between the lower wall of the reflector and the lower wall of the main body of the lamp body in relation with the vehicle body structure. As the lower portion of the reflector is generally slightly affected by heat radiated from the discharge bulb, it is preferable to dispose the lighting circuit case between the lower wall of the reflector and the lower wall of the main body of the lamp body.

Alternatively, if the mounting portion for the lighting circuit case is formed in the cover and the opening is formed in the lower wall of the main body of the lamp body such that the lighting circuit case is preliminarily mounted to the cover, the lighting circuit case can be fitted to the lamp body by simply mounting the cover to the main body of the lamp body during lamp assembly. The efficiency of the lamp assembly operation thus can be improved.

If the mounting portion is formed as a recess portion along a cross section of the lighting circuit case, the lighting circuit case can be easily positioned and fixed to the cover.

Generally, part of the walls constituting the lighting circuit case can be used as a heat radiating surface. In the conventional arrangement where the lighting circuit case is mounted to the outside of the lamp body, the upper wall surface of the lighting circuit case will act as a heat radiating surface so as to improve the radiation efficiency. However, depending on the location of the lighting circuit case, if the upper wall surface of the case is intended as a heat radiating surface, such a surface may actually become a heat absorbing surface owing to heat radiated from the discharge bulb, leading to an adverse effect on the lighting circuit.

On the other hand, if the wall surface of the lighting circuit case opposite the discharge bulb is employed for radiating heat generated by the lighting circuit, adverse effects on the lighting circuit can be prevented. Such an arrangement can in fact make the temperature distribution within the lamp body uniform, thus avoiding the formation of condensation within the lamp body.

In the structure described above, the lamp body accommodates only a single reflector. However, the lamp body can be structured to accommodate both the above-described reflector and a second reflector disposed closely adjacent thereto. If a lamp assembly structure accommodating a second reflector is employed, if the lighting circuit case is disposed between the optical axis of the main reflector and the optical axis of the second reflector, the high voltage cable, or other power-supply cord, from the lighting circuit case can be extended through the space between the two reflectors. This further facilitates mounting of the lighting circuit case to the lamp body.

DESCRIPTION OF THE PREFERRED EMBODIMENTS

Figure 1:
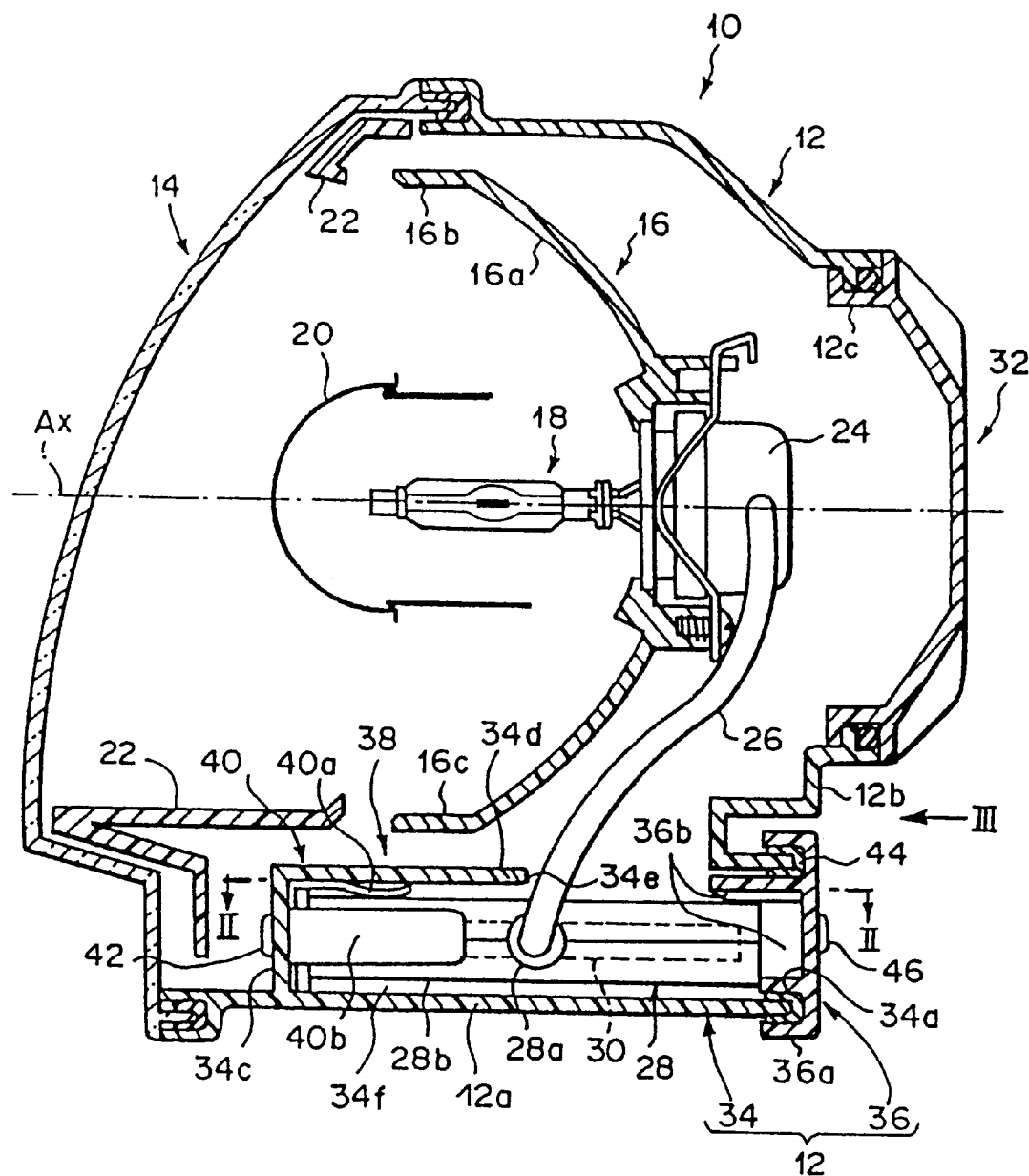
FIG. 1 is a sectional side elevation view of a vehicular headlamp constructed according to a first embodiment of the present invention.

Preferred embodiments of the present invention will be described referring to the drawings.

Figure 2:
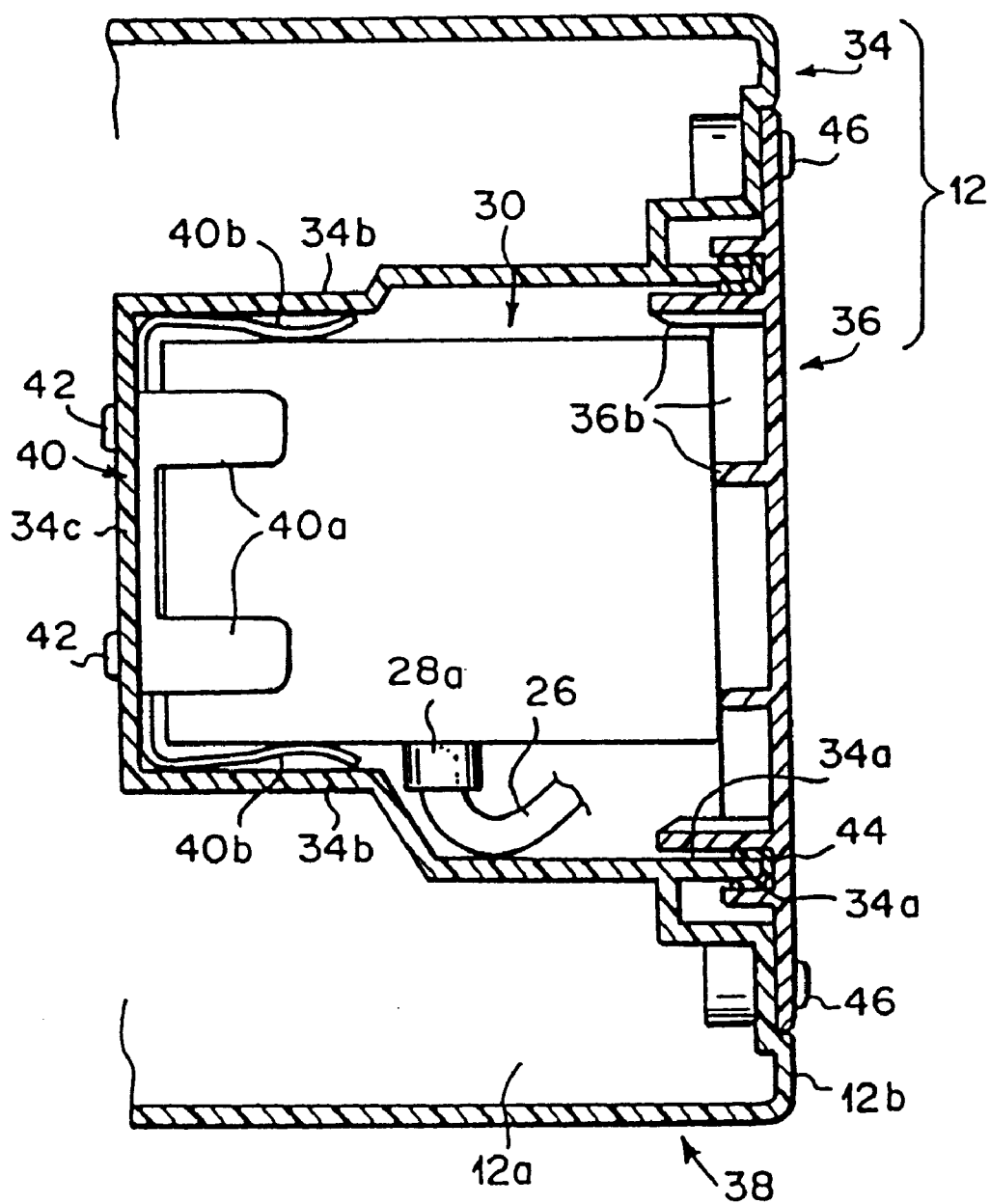
FIG. 2 is a cross-sectional view taken along line II—II in FIG. 1.
Figure 3:
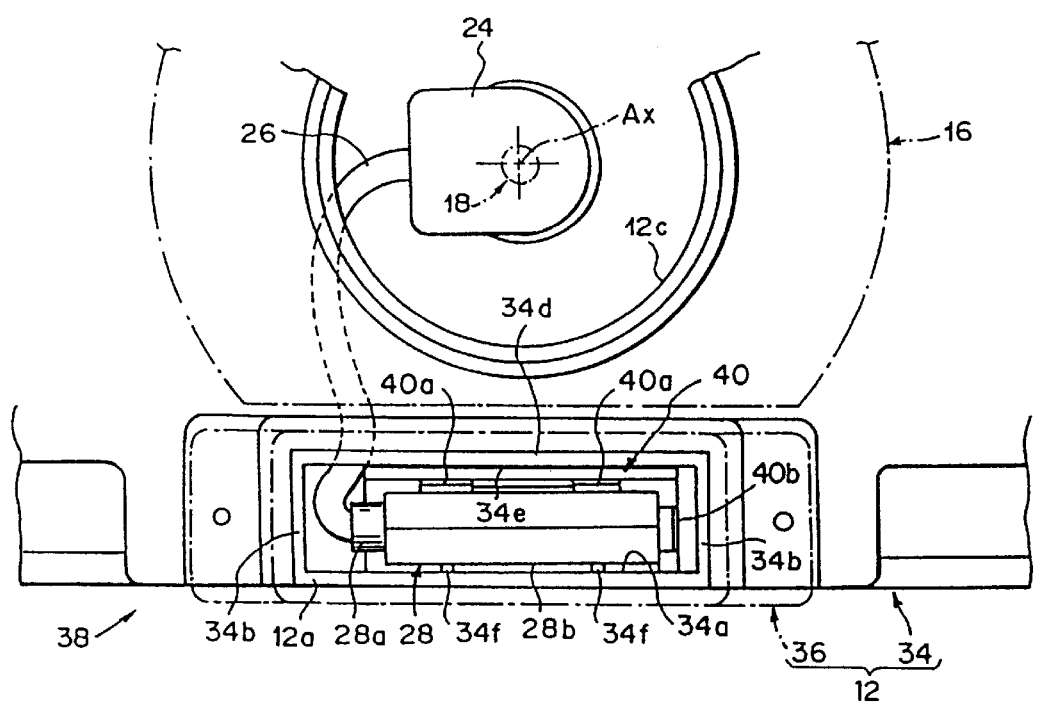
FIG. 3 is a rear view observed from a direction III indicated in FIG. 1.

A first embodiment of the present invention will be described with reference to FIGS. 1–3 of the drawings.

FIG. 1 is a sectional side elevation view of a vehicular headlamp constructed according to this embodiment. FIGS. 2 and 3 respectively show a sectional view taken along line II—II in FIG. 1 and a view observed from a direction III indicated in FIG. 1.

As the drawings show, a headlamp 10 according to this embodiment includes a reflector 16 which can be adjusted by being inclined both longitudinally and laterally, and which is mounted in a space defined by a lamp body 12 and a lens 14.

Attached to the reflector 16 on its optical axis Ax is a discharge bulb (metal halide bulb) 18. A reflecting surface 16a has an upper wall 16b and a lower wall 16c at its upper and lower ends. The reflector 16 has a shade 20 which covers the forward side of the discharge bulb 18. An extension 22 is provided on the forward side of the reflector 16 along the periphery of its opening.

The discharge bulb 18 is connected to a lighting circuit 30 through a bulb socket 24 and a high voltage cable 26 as the discharge bulb 18 requires a high voltage for lighting. The lighting circuit 30, which includes both a starting circuit and a stabilizing circuit, is mounted in a lighting circuit case 28. The lighting circuit case 28 is disposed within the lamp body 12 between a lower wall 12a of the lamp body 12 (in this embodiment, identical to a lower wall of a main body 34 of the lamp body to be described later) and a lower wall 16c of the reflector 16.

A rear wall 12b of the lamp body 12 has an opening 12c through which the discharge bulb 18 can be replaced. A back cover 32 is attached to the opening 12c for bulb replacement.

The lamp body 12 is composed of a main body 34 made of resin and a cover 36. A lower end of the rear wall 12b of the main body 34 has an opening 34a in a rectangular shape having a relatively long lateral extent. The cover 36 is attached to the main body 34 of the lamp body so as to close the opening 34a. At a position forward of the opening 34a of the main body 34 of the lamp body, a mounting portion 38 for the lighting circuit case is formed for mounting the lighting circuit case 28.

The mounting portion 38 for the lighting circuit case is defined by the lower wall 12a, which is partially exposed in the downward direction to form a rectangular recess portion, a pair of right and left side walls 34b, front wall 34c and upper wall 34d. A communication opening 34e is formed to the rear of the upper wall 34d for communicating the inner space of the mounting portion 38 for the lighting circuit case with upper space of the lamp chamber.

A metal mold used for molding the main body 34 of the lamp body having the above-described structure is composed of a mold section for molding a main space of the lamp chamber and a mold section for molding the inner space of the mounting is portion 38 for the light circuit case. These mold sections are arranged to move relatively in opposite directions such that a mold matching surface therebetween defines the communication opening 34e.

The lighting circuit case 28 has a thin box-like shape and an extension portion 28a formed in its side wall surface through which the high voltage cable 26 extends. A lower wall surface 28b of the lighting circuit case 28 forms a radiating surface for radiating heat generated by the lighting circuit 30.

The lighting circuit case 28 is inserted into the opening 34a from the rear side so as to be fitted to the mounting portion 38 for the lighting circuit case. At the time the lighting circuit case 28 is inserted into the opening 34a, the bulb socket 24 and the high voltage cable 26 are preliminarily drawn into the main space of the lamp chamber through the opening 34a and the communication opening 34e. This facilitates a smooth mounting operation.

The mounting portion 38 for the lighting circuit case has a pair of right and left ribs 34f extending transversely on an upper surface of the lower wall 12a. The ribs 34f define a clearance at a lower side of the lighting circuit case 28 when fitted to the mounting portion 38 for the lighting circuit case, thus preventing interruption of the heat radiating function of the lower wall surface 28b.

A metal mounting 40 for engaging the lighting circuit case is fixed to the rear surface of the front wall 34c of the mounting portion 38 for the lighting circuit case with two screws 42. The metal mounting 40 for engaging the lighting circuit case is formed by folding a metal plate, and it is composed of a pair of elastic engagement pieces 40a abutting an upper surface of the lighting circuit case 28 and a pair of elastic engagement pieces 40b abutting the two side surfaces of the lighting circuit case 28. The elastic engagement pieces 40a and 40b serve to guide the mounting of the lighting circuit case 28 to the mounting portion 38 for the lighting circuit case so as to hold the lighting circuit case 28 in its intended fitted position.

The cover 36 is formed with a rectangular shape with long sides having a length relatively larger than the opening 34a of the main body 34 of the lamp body. The side walls of the cover 36 are provided with a seal groove 36a along their front periphery. A gasket 44 is disposed in the seal groove 36a. The cover 36 is press fitted to the rear end surface of the opening 34a of the main body 34 of the lamp body. The cover 36 is further fixed to the main body 34 of the lamp body with screws 46 at its two ends. The cover 36 has a plurality of ribs 36b abutting the upper surface and both side surfaces of the lighting circuit case 28 for holding the lighting circuit case 28 in its fitted position.

As described in detail above, the vehicular headlamp 10 according to this embodiment includes the lighting circuit case 28 disposed within the lamp body 12. With the described construction, the lighting circuit case 28 can be formed with a simple and light-weight structure at a low cost with no need of a full waterproofing. The lamp body 12 is composed of a main body 34 of the lamp body having a rearward facing opening 34a, and a cover 36 attached to the main body 34 of the lamp body to close the opening 34a. As the mounting portion 38 for the lighting circuit case is formed at a position close to the forward side of the opening 34a of the main body 34 of the lamp body, the lighting circuit case 28 can be inserted from the rear side through the opening 34a and the cover 36 attached to the main body 34 of the lamp body. The resultant mounting structure is thus simplified compared with the conventional approach.

In this embodiment, the cover 36 can be attached with a screwdriver from the rear side, and hence the lighting circuit case 28 can be easily attached to or removed from the lamp body 12.

In this embodiment, the lighting circuit case 28 is disposed between the lower wall 16c of the reflector 16 and the lower wall 12a of the lamp body 12. The lower wall surface 28b of the lighting circuit case 28 acts as the heat radiating surface. This arrangement prevents adverse effects due to the heat radiated by the discharge bulb 18 and keeps the temperature distribution within the lamp body 12 uniform, thus avoiding formation of condensation within the lamp body.

Temperatures of the upper wall surface and the lower wall surface of the lighting circuit case 28 in a vehicular headlamp 10 constructed according to the above-described embodiment were measured under the condition where the discharge bulb 18 was turned ON. The upper wall surface measured about 104° C. and the lower wall surface measured about 92° C. Under the condition where the lighting circuit case 28 was disposed upside-down, the upper wall surface measured about 115° C. and the lower wall surface measured about 85° C. These measurement results support the aforementioned effects of the present invention.

In this embodiment, as the lighting circuit case 28 is inserted in the same direction as the direction for drawing the metal mold used to produce the main body 34, it is not necessary to employ a metal mold having a slide core to form the mounting portion 38 for the lighting circuit case. Moreover, unlike the conventional approach which employs a process utilizing only one metal mold at a time, the present invention makes it possible to utilize two metal molds simultaneously, thus improving productivity and reducing costs.

A second embodiment of the present invention will next be described.

Figure 4:
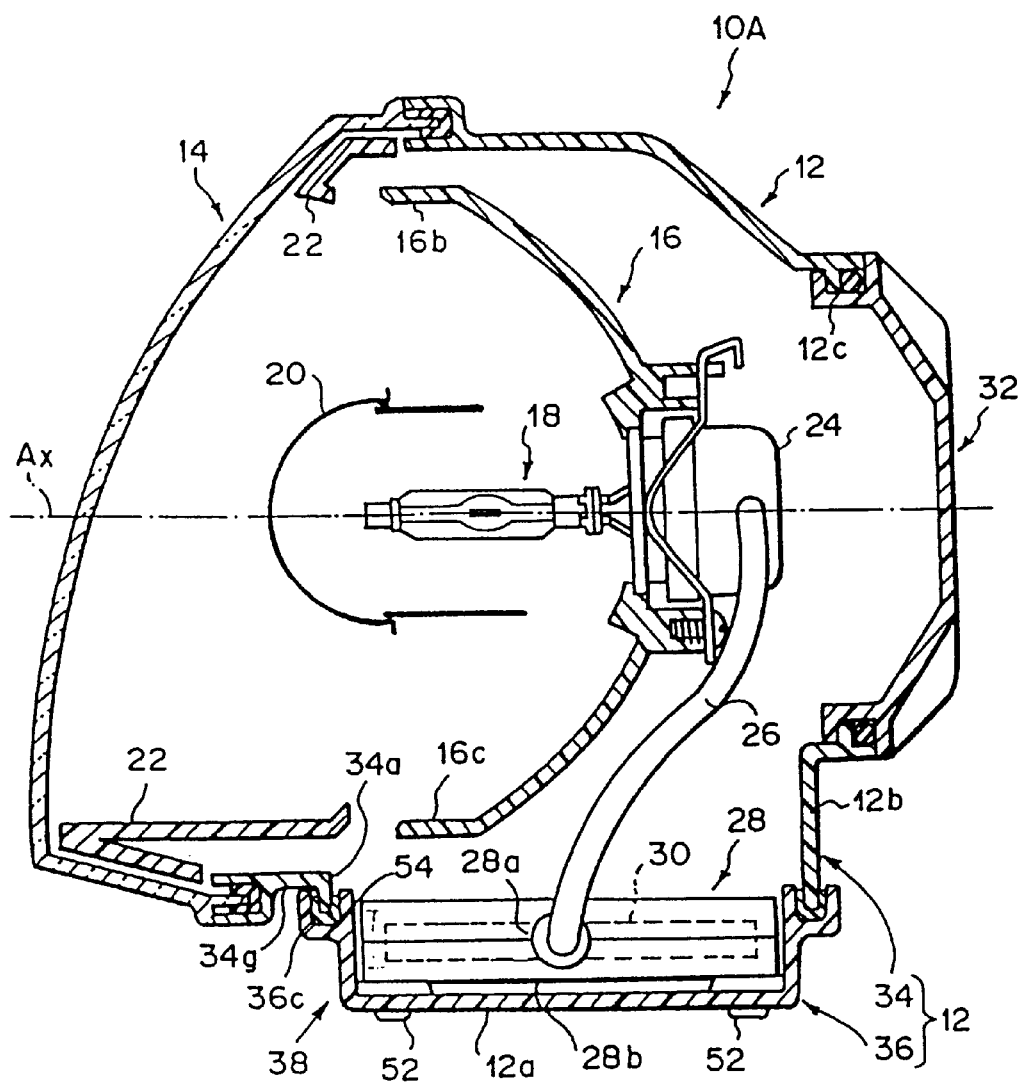
FIG. 4 is a sectional side elevation view of a vehicular headlamp constructed according to a second embodiment of the present invention.

FIG. 4 is a sectional side elevation view of a vehicular headlamp of the second embodiment.

Referring to the drawing, a vehicular headlamp 10A according to this embodiment is identical to the first embodiment in that the lamp body 12 is formed of the main body 34 of the lamp body and the cover 36. However, the second embodiment differs from the first embodiment in that the mounting portion 38 for the lighting circuit case is formed in the cover 36 rather than in the main body 34 of the lamp body, and the opening 34a is formed in the lower wall 34g of the main body 34 of the lamp body.

The mounting portion 38 for the lighting circuit case is formed with a recessed portion along the cross section of the lighting circuit case 28, and the lighting circuit case 28 is mounted in the recessed portion with screws 52. A seal groove 36c is formed around the upper end periphery of the mounting portion 38 of the lighting circuit case in the cover 36. The cover 36 is pressed fitted to the lower end surface of the opening 34a of the main body 34 of the lamp body with the seal groove 36c filled with an adhesive 54 so as to firmly fix the cover 36 to the main body 34 of the lamp body.

As in the first embodiment, in the vehicular headlamp 10A of this embodiment the lighting circuit case 28 is disposed is within the lamp body 12 at a position close to the opening 34a. Therefore the lighting circuit case 28 can be fitted to the lamp body 12 using a simple and inexpensive structure, while allowing easy removal of the lighting circuit case 28.

In this embodiment, the above-described effects can be obtained using a small number of parts. In this embodiment, however, because the opening 34a is formed in the lower wall 34g of the main body 34 of the lamp body, a slide core is required during molding.

Unlike the first embodiment where the cover 36 is fixed to the main body 34 of the lamp body with screws, in this embodiment, the cover is fixed to the main body 34 of the lamp body using an adhesive, thus further facilitating the assembly operation.

The lighting circuit case 28 may be fixed to the lamp body 12 further securely using screws in addition to the adhesive. In such a case, a gasket as employed in the first embodiment or a filler exhibiting relatively lower adhesive strength can be used in place of the adhesive, so that the lighting circuit case 28 can be further readily removed from the lamp body 12.

Next, a third embodiment of the present invention will be described.

Figure 5:
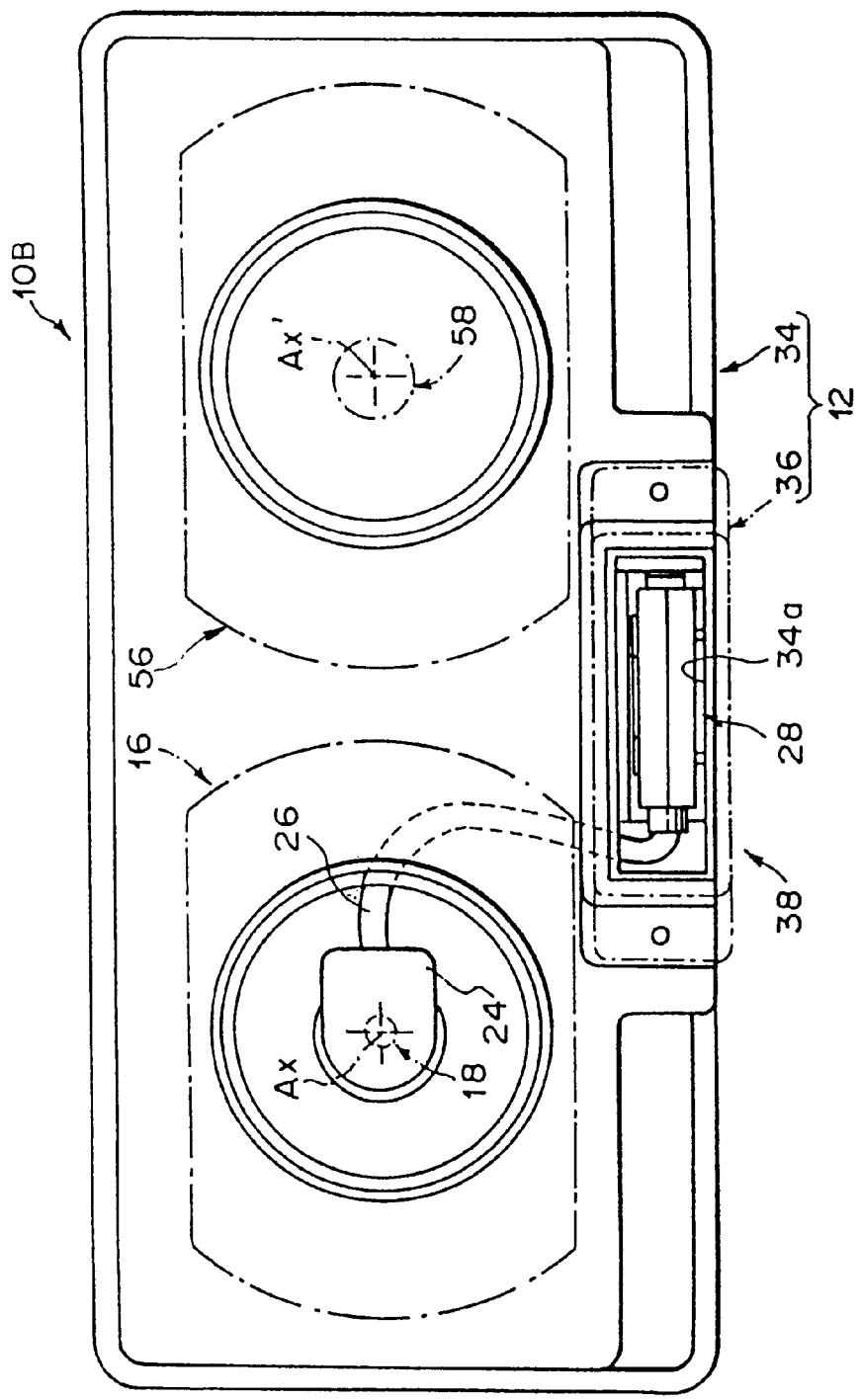
FIG. 5 is a rear elevation view of a vehicular headlamp constructed according to a third embodiment of the present invention.

FIG. 5 is a rear elevation view of a vehicular headlamp according to this embodiment.

Referring to FIG. 5, a vehicular headlamp 10B according to this embodiment is a four-light headlamp having a reflector 16 and a second reflector 56 disposed laterally closely adjacent to one another within the lamp body 12. A halogen bulb 58 is fitted to the reflector 56. A lighting circuit case 28 is disposed between the optical axis Ax of the reflector 16 and the optical axis Ax' of the second reflector 56. The structure of the mounting portion for the lighting circuit case is the same as that of the first embodiment.

In the above-described four-light headlamp, as the lighting circuit case 28 is disposed between the optical axis Ax of the reflector 16 and the optical axis Ax' of the reflector 56, the high voltage cable 26 or power supply cord (not shown) extending from the lighting circuit case 28 can be pulled through the space between the reflectors 16 and 56. This further facilitates mounting of the lighting circuit case 28 to the lamp body 12.

A fourth embodiment of the present invention will now be described.

Figure 6:
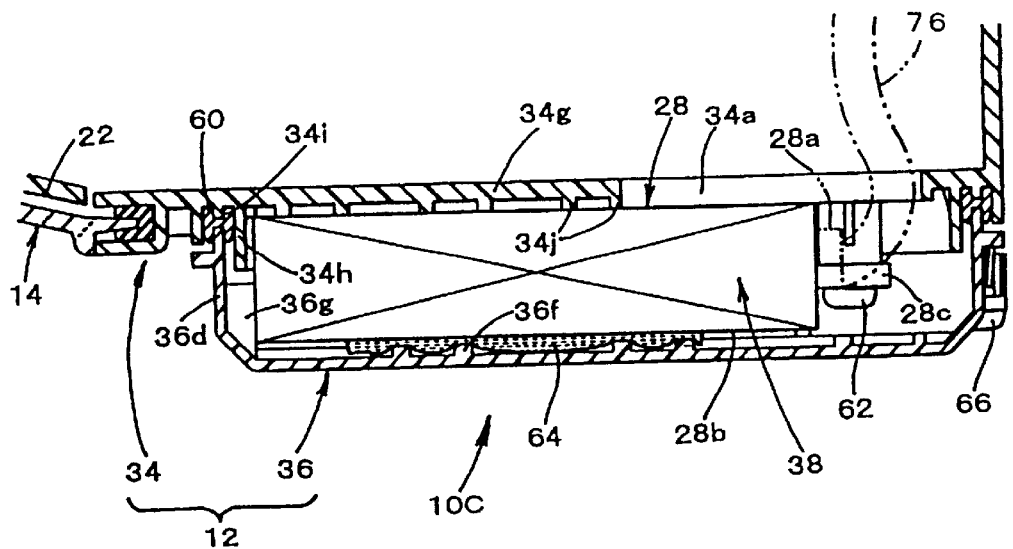
FIG. 6 is a side elevation showing an essential portion of a vehicular headlamp constructed according to a fourth embodiment of the present invention.
Figure 7:
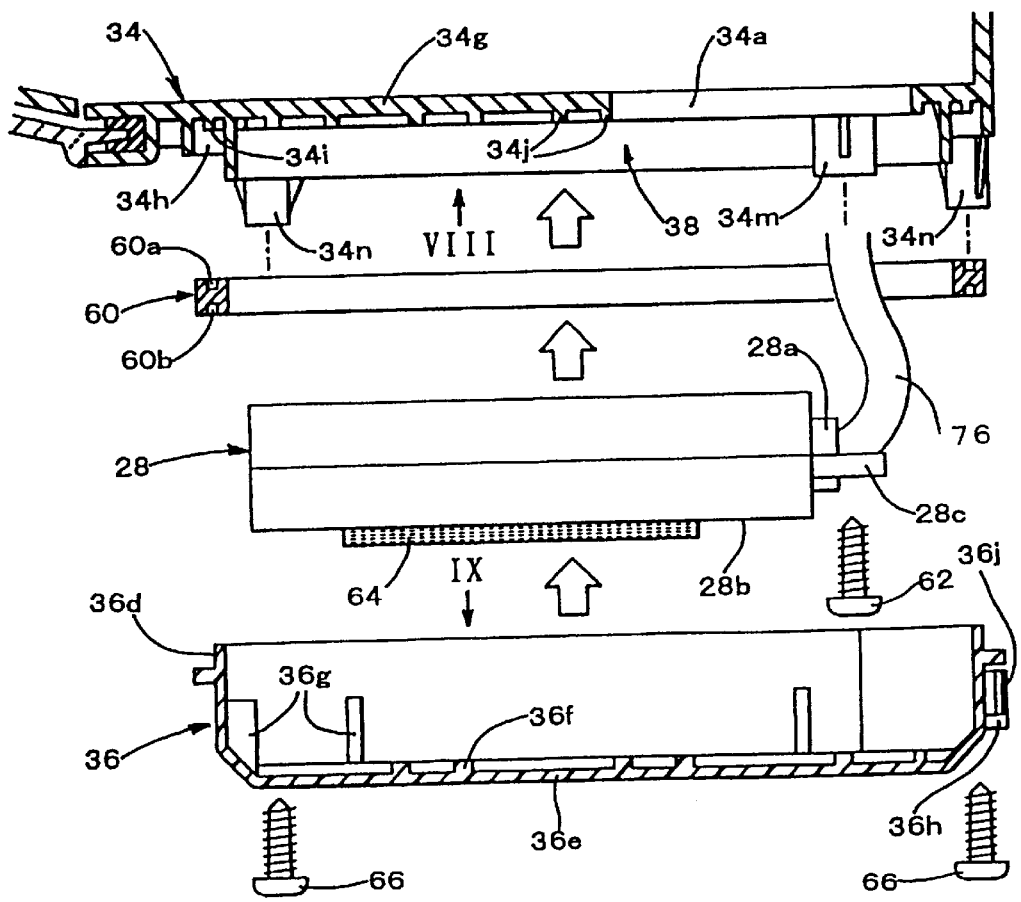
FIG. 7 is an exploded view showing essential portions of the vehicular headlamp according to the fourth embodiment of the present invention.
Figure 8:
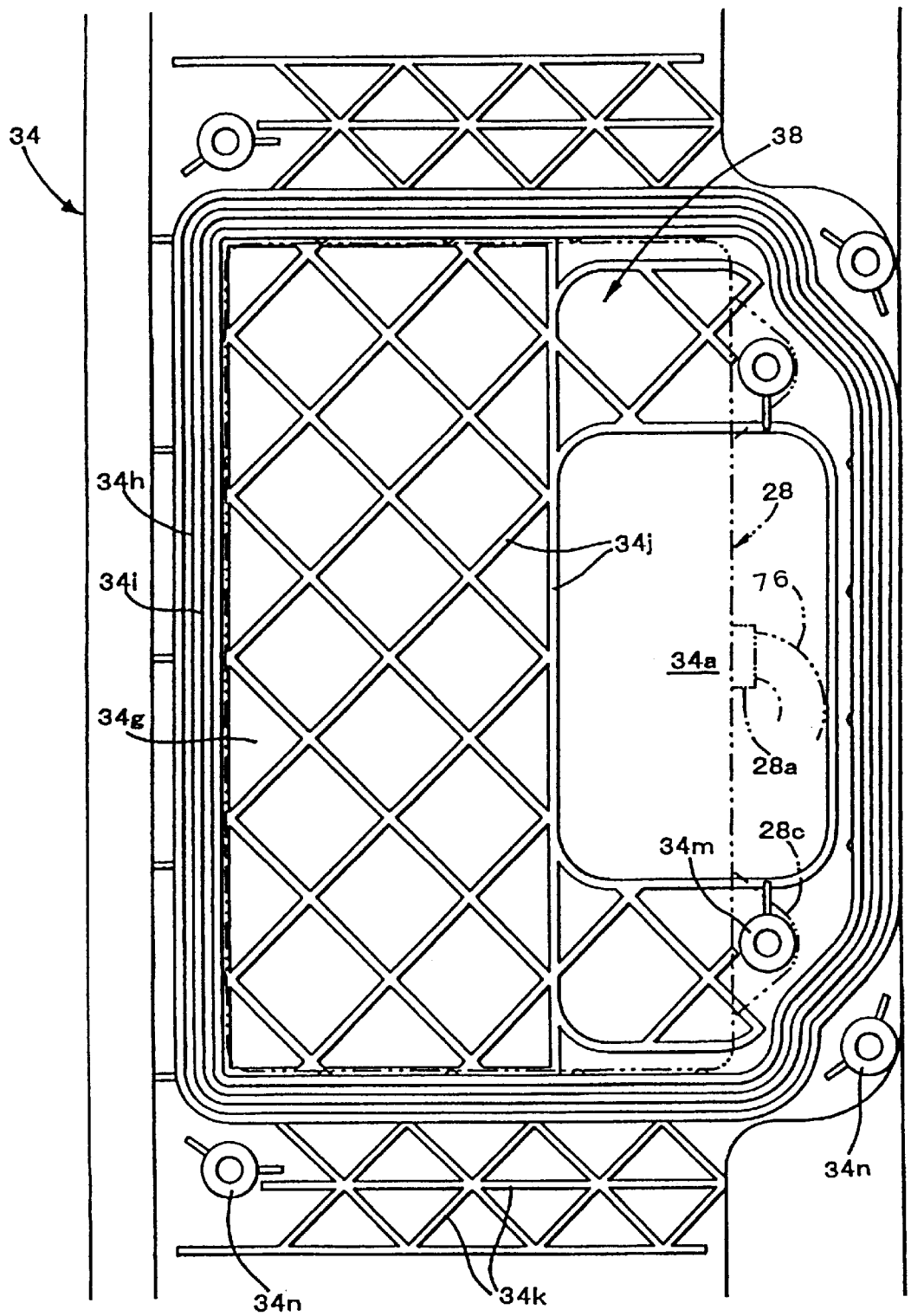
FIG. 8 is a view observed from a direction VIII indicated in FIG. 7.
Figure 9:
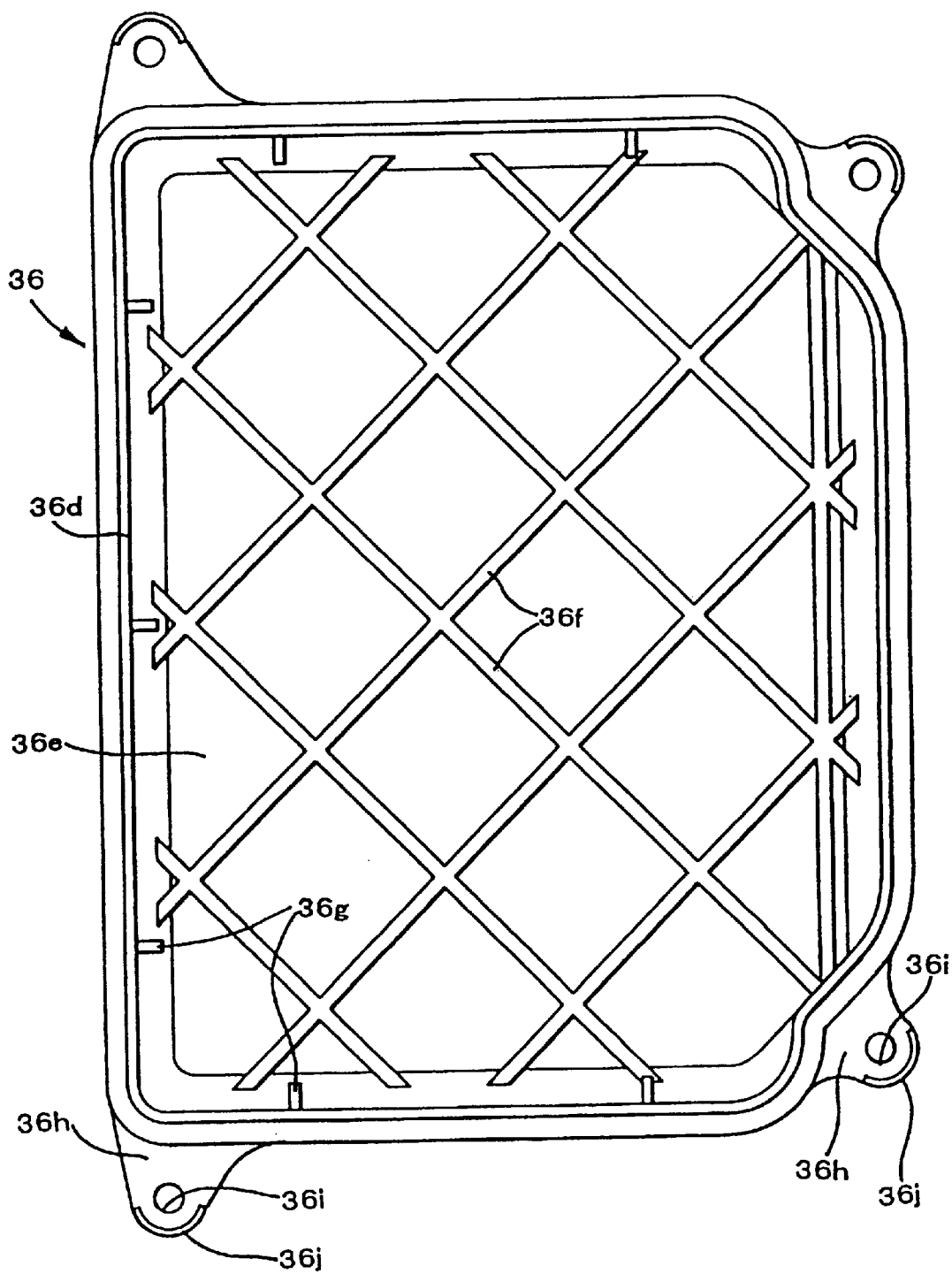
FIG. 9 is a view observed from a direction IX indicated in FIG. 7.

FIG. 6 is a sectional side elevation view showing an essential portion of a vehicular headlamp of this embodiment. FIG. 7 is an exploded view of FIG. 6. FIGS. 8 and 9 are views observed from directions VIII and IX, respectively, indicated in FIG. 7.

As shown in these drawings, the headlamp 10C of this embodiment has substantially the same structure as that of the first embodiment, except that the opening 34a is formed in the lower wall 34g of the main body 34 and the mounting portion 38 of the lighting case is disposed on the lower surface of the lower wall 34g. In this embodiment, the cover 36 is mounted to the main body 34 in a state where the lighting circuit case 28 is fitted with the mounting portion 38 of the lighting case.

The cover 36 is mounted to the main body 34 by screws while being abutted on the main body 34 via an annular gasket 60.

An annular groove 34h is formed in the lower wall 34g of the main body 34 for mounting the gasket 60. A protrusion 34i having a rectangular cross section is formed in substantially the center of the annular groove 34h which extends therealong.

The gasket 60 has an H-shaped cross section such that an upper recessed portion 60a thereof is engaged with the protrusion 34i when the gasket 60 is fitted in the annular groove 34h. A lower recessed portion 60b of the gasket 60 is formed so as to be fitted with the tip of the peripheral flange 36d of the cover 36 while being abutted on the main body 34.

The opening 34a of the main body 34 is formed in substantially a rectangular shape and disposed at the center of a rear portion of a region inside the annular groove 34h of the lower wall 34g (i.e., the region defining the mounting portion 38 of the lighting case). A plurality of reinforcing ribs 34j are formed in the other part of the region. These reinforcing ribs 34j form a diagonal grating over substantially the whole surface of the region along the periphery of the opening 34a. A plurality of reinforcing ribs 34k are also formed in a region in the vicinity of right and left sides of the annular groove 34h formed in the lower wall of the main body 34.

A pair of bosses 34m for mounting the case are respectively formed at positions in the vicinity of right and left sides of the opening 34a in the region inside the annular groove 34h of the lower wall 34g of the main body 34. Two pairs of bosses 34n for mounting the cover are longitudinally formed at positions in the vicinity of right and left sides of the annular groove 34h of the lower wall 34g in a region outside thereof.

In this embodiment, the lighting circuit case 28 is laid onto the mounting portion 38 of the lighting case 28 of the main body 34 such that the extension portion 28a of the high voltage cable 76 is located to the rear of the lighting circuit case 28. A pair of tabs 28c, each having a through hole, are formed in the rear surface of the lighting circuit case 28. The lighting circuit case 28 is mounted to the mounting portion 38 of the lighting case by tightening a screw 62 into the boss 34m for fixing the case through the through hole of the tab 28c, while each tab 28c is abutted on the boss 34m for fixing the case of the main body 34. At this time, the upper surface of the lighting circuit case 28 abuts against the lower wall 34g. However, the abutment is accomplished through the reinforcing ribs 34j formed in the lower wall 34g so as to prevent the two surfaces from being directly abutted against one another.

A rectangular sponge member 64 extending in the longitudinal direction is adhered to right and left points of the lower wall 28b of the lighting circuit case 28. When the cover 36 is mounted to the main body 34, the sponge member 64 serves to prevent the lighting circuit case 28 from being directly abutted against the lower wall 36e of the cover 36.

A plurality of reinforcing ribs 36f form a diagonal grating over substantially the entire region of the upper surface of the lower wall 36e of the cover 36. In this manner, a heat releasing space is defined between the lower wall 28b of the lighting circuit case 28 and the lower wall 36e of the cover 36.

A plurality of positioning ribs 36g are formed on the inner surface of the lower portion of the peripheral flange 36d of the cover 36. When the cover 36 is mounted to the main body 34, these positioning ribs 36g are brought into abutment with the outer peripheral surface of the lighting circuit case 28, thus preventing horizontal displacement of the lighting circuit case 28.

Two pairs of brackets 36h are longitudinally formed at the outer periphery of the peripheral flange 36d of the cover 36. A through hole 36i through which the screw 66 extends is formed in each of the brackets 36h to allow the cover 36 to be screw mounted to the main body 34. A guide rib 36j surrounding the through hole 36i in a circular manner is formed at the top end of each bracket 36h so as to extend upward. Each of the guide ribs 36j is disposed at a position in the vicinity of the boss 34n for fixing the cover of the main body 34 when mounting the cover 36 to the main body 34. These guide ribs 36j serve as a guide for mounting the cover 36 to the main body 34 as well as preventing horizontal displacement of the cover 36 after mounting.

In the vehicular headlamp 10C of this embodiment, as in the first embodiment, the lighting circuit case 28 is disposed closely adjacent the opening 34a within the lamp body 12.

As a result, the lighting circuit case 28, which has a simple and inexpensive structure, is mounted to the lamp body 12. The lighting circuit case 28 can be easily removed.

In this embodiment, as the mounting portion 38 of the lighting case is formed on a lower surface of the lower wall 34g of the main body 34, the size of the opening 34a may be made relatively small, that is, sufficient just to allow the high voltage cable 76 to pass therethrough. As a result, the rigidity of the lower wall 34g of the main body 34 is improved. As a plurality of reinforcing ribs 34j, 34k are formed in the lower wall 34g of the main body 34, the rigidity of the lower wall 34g is further enhanced.

A plurality of reinforcing ribs 34j formed on the lower wall 34g of the main body 34 prevents the lighting circuit case 28 from abutting directly against the surface of the lower wall 34g of the main body 34. As a result, the lighting circuit case 28 is not substantially affected by heat generated within the main body 34.

In this embodiment, a plurality of reinforcing ribs 36f are formed on the upper surface of the lower wall 36e of the cover 36 over substantially the entire region thereof. When the cover 36 is mounted to the main body 34, the sponge member 62 is interposed between the reinforcing ribs 36f and the lower wall 28b of the lighting circuit case 28. Accordingly, when mounting the cover 36 to the main body 34, a sufficient heat releasing space is formed between the lower wall 28b of the lighting circuit case 28 and the lower wall 36e of the cover 36. Such space also provides a cushioning effect between the lighting circuit case 28 and the cover 36.

In this embodiment, the lighting circuit case 28 is not substantially affected by the heat generated within the main body 34. It is therefore possible to employ the upper surface is of the lighting circuit case 28 as the heat releasing surface.

In this embodiment, the cover 36 is mounted to the main body 34 by screws while being abutted on the main body 34 via the gasket 60. The gasket 60 has an H-shaped cross section that can be deformed in compression such that the protrusion 34i of the main body 34 fitted with the upper recess portion 60a and the lower recess portion 60b is brought into contact with a top end of the peripheral flange 36d of the cover 36. This improves the sealing capability between the cover 36 and the main body 34.

A fifth embodiment of the present invention will be described subsequently.

Figure 10:
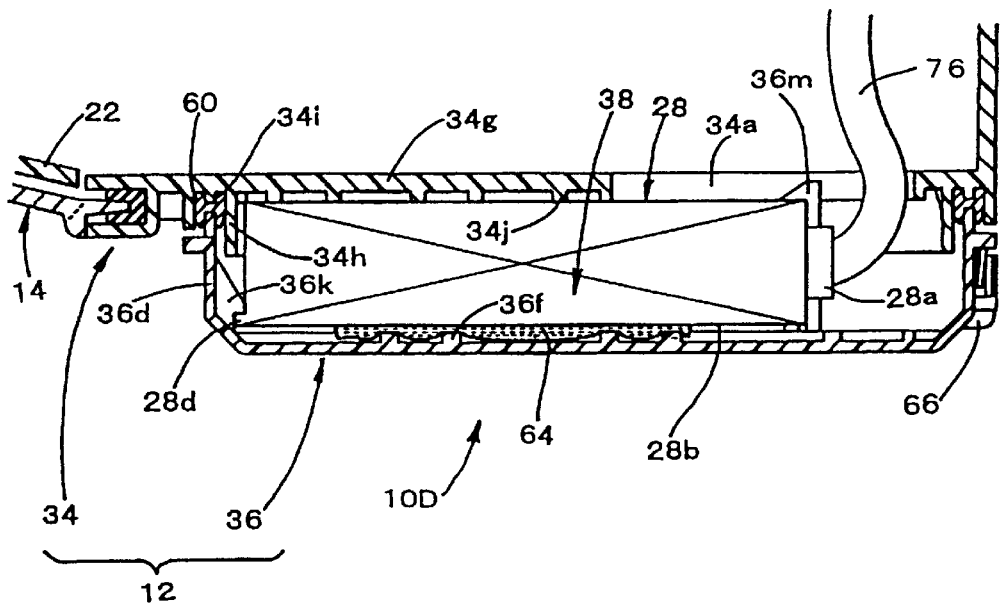
FIG. 10 is a side elevation showing an essential portion of the vehicular headlamp according to a fifth embodiment of the present invention.
Figure 11:
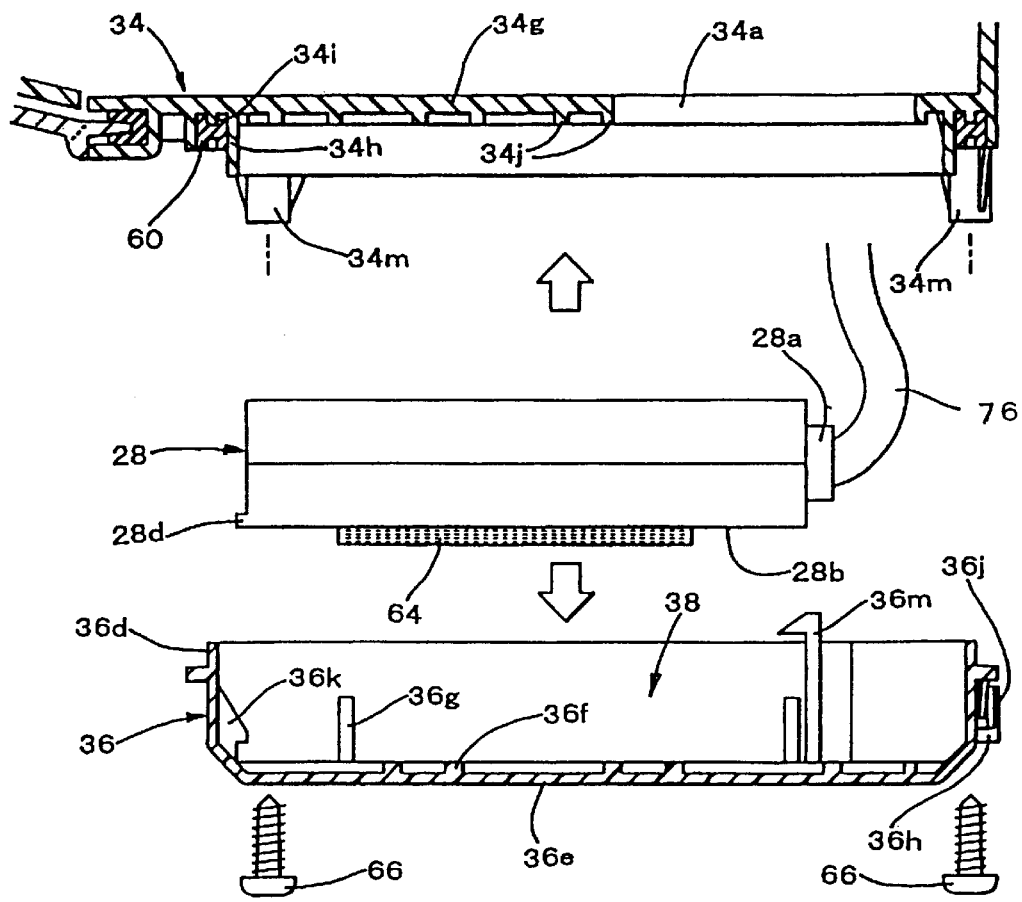
FIG. 11 is an exploded view showing the essential portion of the vehicular headlamp according to the fifth embodiment.
Figure 12:
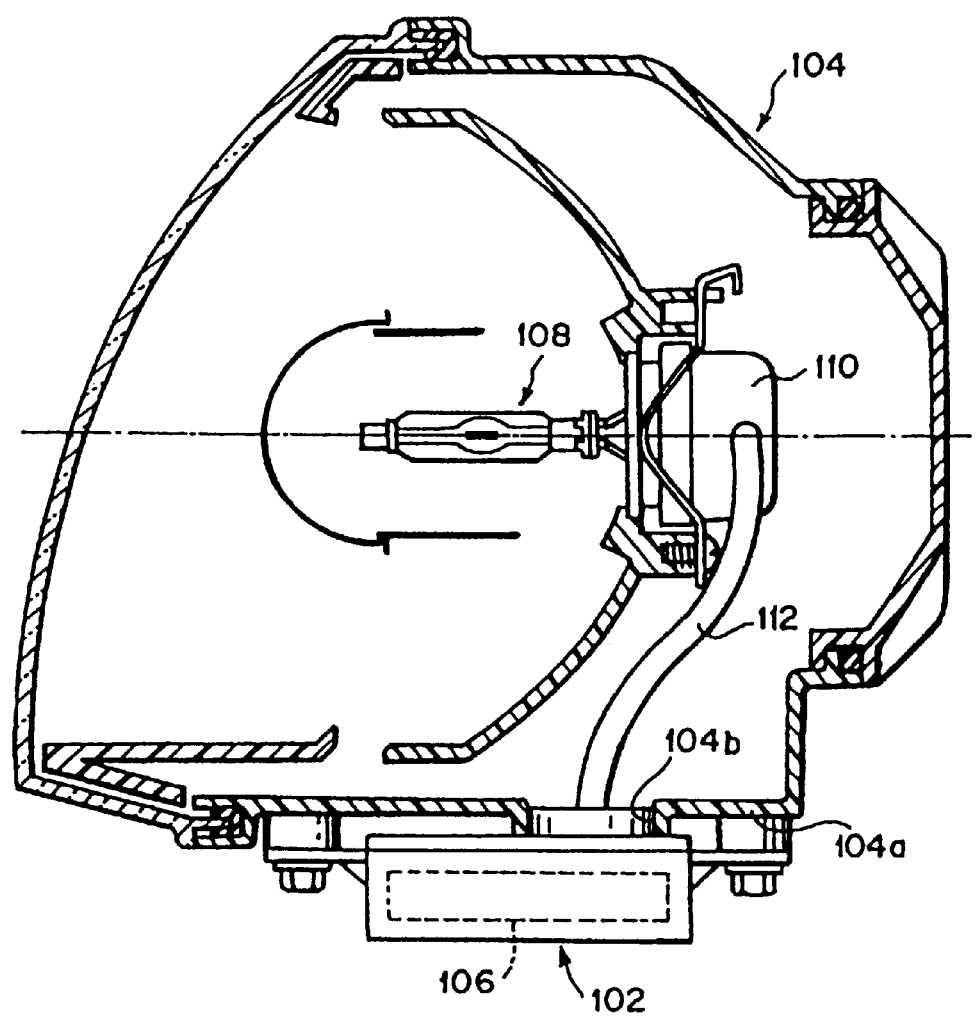
FIG. 12 is a view similar to FIG. 1 but showing a conventional headlamp.

FIG. 10 is a side elevation showing an essential portion of the vehicular headlamp of this embodiment. FIG. 11 is an exploded view of FIG. 10.

As shown in these drawings, a vehicular headlamp 10D of this embodiment has a structure similar to that of the fourth embodiment, except that the mounting portion 38 of lighting circuit case is disposed in the cover 36.

In this embodiment, a laterally extending linear protrusion 28d is formed at a lower end portion of a front surface of the lighting circuit case 28. A plurality of engagement ribs 36k, which are to be engaged with the linear protrusion 28d, are formed on the inner surface of the lower portion of the front wall of the peripheral flange 36d of the cover 36. A pair of right and left elastic engagement pieces 36m, which are to be engaged with the upper end corners of the rear surface of the lighting circuit case 28, are formed at the rear portion of the upper surface of the lower wall 36e of the cover 36. The lighting circuit case 28 is positioned both vertically and longitudinally with the aid of the plurality of engagement ribs 36k and both elastic engagement pieces 36m. The lighting circuit case 28 is positioned laterally with the aid of positioning ribs 36g formed on each inner surface of the lower portion of both right and left walls of the peripheral flange 36d of the cover 36.

The lighting circuit case 28 is mounted to the cover 36 by engaging the linear protrusion 28d of the lighting circuit case 28 with the engagement rib 36k of the cover 36, depressing the rear end portion of the lighting circuit case 28 to elastically deform both elastic engagement pieces 36m rearward so as to be fitted therewith.

The cover 36 is mounted to the main body 34 in the same o manner as described in the fourth embodiment.

The same effects as those of the fourth embodiment can be obtained by employing the structure of this embodiment. This embodiment is further advantageous in that the number of parts required can be less than the fourth embodiment.

What is claimed is:

1. A vehicular headlamp comprising:
    a main body having an open front portion and a first opening formed in a rear portion of said main body and a second opening formed in a lower portion of said main body;
    a reflector disposed within said main body;
    a lens covering said open front portion;
    a discharge bulb mounted on said reflector; and
    a lighting circuit unit comprising a lighting circuit case and a lighting circuit within said lighting circuit case for operating said discharge bulb;
    wherein said lighting circuit case is mounted in a position within said main body adjacent said second opening, and wherein a removable cover is attached to said main body so as to close and seal said second opening.

2. The vehicular headlamp according to claim 1, wherein a mounting portion for said lighting circuit case is formed in said main body, and said second opening is formed to a rear of said mounting portion relative to said main body.

3. The vehicular headlamp according to claim 1, wherein a mounting portion for said lighting circuit case is formed in said main body, and said second opening is formed in a rear wall of said lower portion of said main body.

4. The vehicular headlamp according to claim 2, wherein said lighting circuit case is disposed between a lower wall of said reflector and a lower wall of said main body.

5. The vehicular headlamp according to claim 1, wherein a surface of said lighting circuit case facing, away from said discharge bulb acts as a radiating surface for radiating heat generated by said lighting circuit.

6. The vehicular headlamp according to claim 1, wherein a mounting portion for mounting said lighting circuit case is a recess in said cover, and said second opening is formed in a lower wall of said main body.

7. The vehicular headlamp according to claim 1, wherein said second opening is formed in a lower wall of said main lamp body.

8. The vehicular headlamp according to claim 7, wherein said second opening is substantially smaller than said cover.

9. The vehicular headlamp according to claim 7, wherein said second opening is dimensioned to allow insertion of said lighting circuit case therethrough.

10. The vehicular headlamp according to claim 7, wherein said cover has a seal groove formed along a peripheral portion thereof, and further comprising a gasket disposed in said seal groove for providing sealing between said cover and said main body.

11. The vehicular headlamp according to claim 1, further comprising a shock absorbing material disposed between said cover and said lighting circuit case.

12. The vehicular headlamp according to claim 1, further comprising a second reflector disposed in said main body, wherein said second opening is formed below and between said first-mentioned reflector and said second reflector.

13. The vehicular headlamp according to claim 6, further comprising a plurality of ribs formed on said lower wall of said main body contacting said lighting circuit case.

14. The vehicular headlamp according to claim 6, further comprising a plurality of ribs formed on a wall of said cover contacting said lighting circuit case.

15. The vehicular headlamp according to claim 6, further comprising a first plurality of ribs formed on said lower wall of said main body, wherein said first plurality of ribs contact said lighting circuit case on a first side thereof, and a second plurality of ribs formed on a wall of said cover, wherein said seconds plurality of ribs contact a second side of said lighting circuit case opposite said first side.

16. The vehicular headlamp according to claim 6, wherein an annular groove is formed in said lower wall and a protrusion having a rectangular cross section is formed in substantially the center of said annular groove extending along said annular groove, and further comprising an H-shaped gasket engaged on one side with said protrusion and on an opposite side with a tip of a peripheral flange of said cover.

17. A vehicular headlamp comprising:
- a main body having an open front portion and an opening formed in a lower wall of said main body;
- a reflector disposed within said main body;
- a lens covering said open front portion;
- a discharge bulb mounted on said reflector;
- a lighting circuit unit comprising a lighting circuit case and a lighting circuit within said lighting circuit case for operating said discharge bulb;
- a cover removably attached to said lower wall of said main body so as to close and seal said opening, wherein said lighting circuit case is mounted in a position within said main body adjacent said opening;
- a mounting portion for mounting said lighting circuit case in said position, wherein said mounting portion is a recess in said cover; and
- a first plurality of ribs formed on said lower wall of said main body, said first plurality of ribs contacting said lighting circuit case on a first side thereof, and a second plurality of ribs formed on a wall of said cover, said second plurality of ribs contacting a second side of said lighting circuit case opposite said first side.

18. The vehicular headlamp according to claim 17, wherein an annular groove is formed in said lower wall and a protrusion having a rectangular cross section is formed in substantially the center of said annular groove extending along said annular groove, and further comprising an H-shaped gasket engaged on one side with said protrusion and on an opposite side with a tip of a peripheral flange of said cover.

19. The vehicular headlamp according to claim 18, wherein said lighting circuit case comprises a laterally extending linear protrusion formed at a lower end portion thereof, and said cover comprises a plurality of engagement ribs engaged with said linear protrusion.

20. The vehicular headlamp according to claim 19, wherein said cover further comprises at least one elastic engagement piece engaged with an upper surface of said lighting circuit case for holding said lighting circuit case to said cover.

21. A vehicular headlamp comprising:
- a main body having an open front portion and an opening formed in a lower wall of said main body;
- a reflector disposed within said main body;
- a lens covering said open front portion;
- a discharge bulb mounted on said reflector;
- a lighting circuit unit comprising a lighting circuit case and a lighting circuit within said lighting circuit case for operating said discharge bulb;
- a cover removably attached to said lower wall of said main body so as to close and seal said opening, wherein said lighting circuit case is mounted in a position within said main body adjacent said opening; and
- a mounting portion for mounting said lighting circuit case in said position, wherein said mounting portion is a recess in said cover.

* * * * *